J. D. WESTGATE,

Assignor, by mesne assignments to J. E. PECK, Trustee.

Edge Trimming Tool for Boots and Shoes.

No. 9,766. Reissued June 14, 1881.

Witnesses:
W. S. Bellows,
Geo. Marshall

Inventor,
J. D. Westgate.
Per Brown Bros.
Attorneys.

N. PETERS, Photo-Lithographer, Washington, D. C.

UNITED STATES PATENT OFFICE.

JOSEPH D. WESTGATE, OF SALEM, ASSIGNOR, BY MESNE ASSIGNMENTS, TO JOHN E. PECK, TRUSTEE, OF NEWTON, MASSACHUSETTS.

EDGE-TRIMMING TOOL FOR BOOTS AND SHOES.

SPECIFICATION forming part of Reissued Letters Patent No. 9,766, dated June 14, 1881.

Original No. 215,189, dated May 6, 1879; Application for reissue filed July 1, 1880.

*To all whom it may concern:*

Be it known that I, JOSEPH D. WESTGATE, of Salem, in the county of Essex and State of Massachusetts, have invented certain new and useful Improvements in Edge-Trimmers for Boots and Shoes, of which the following is a full, clear, and exact description.

This invention pertains more particularly to improvements on an edge-trimmer for boot and shoe soles, for which Letters Patent of the United States were issued to me December 10, 1878, No. 210,829, although, as will be obvious from the description hereinafter given of the same, it is applicable to other edge-trimmers.

This improvement, in substance, consists in the combination, with an edge-trimmer for trimming the edges of boot and shoe soles, of a guide or guard constructed and arranged to bear upon the upper at and along the edge of the inner sole as the tool is drawn around the edge of the outer sole to trim it, and in such bearing to enter between the upper and the outer sole, and otherwise in such manner that it can yield or give to the curvature of the shank as the tool is drawn about the edge of the shank, so as to prevent the part of the guard which enters between the upper and the outer sole from separating the outer sole from the upper and the inner sole, all substantially as hereinafter described.

Figure 1:
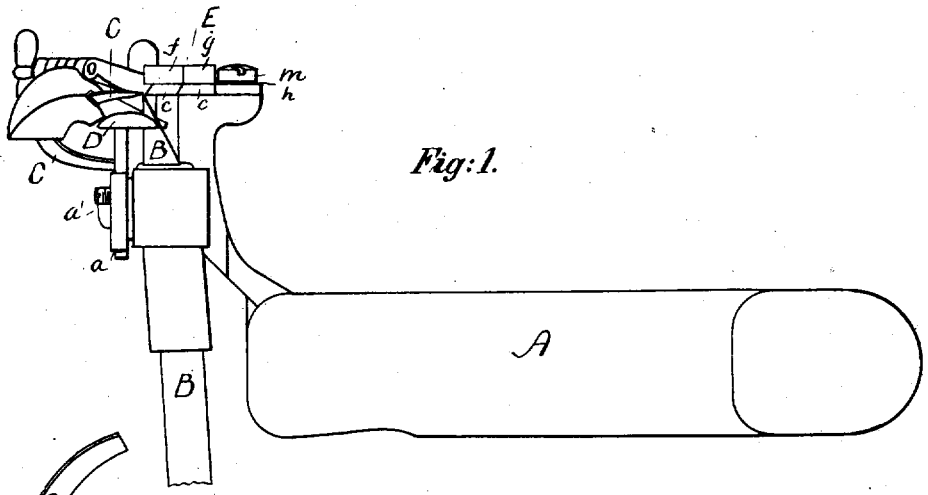
Figure 2:
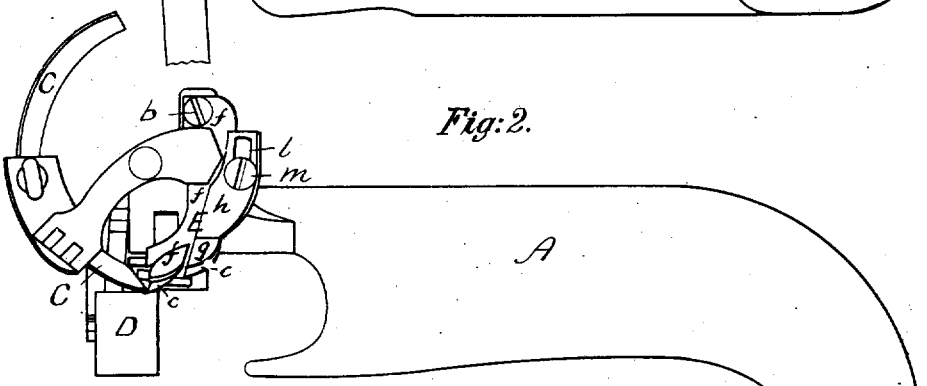
Figure 3:
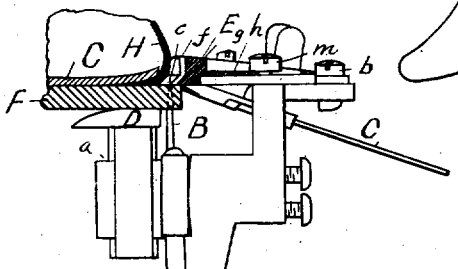

In the accompanying plate of drawings, Figures 1 and 2 are face views of my improved edge-trimmer from different sides, and Fig. 3 is a partial side view and partial vertical section of the tool shown in Fig. 2.

In the drawings, A represents the stock or handle; B, a knife for trimming the edge of the outer sole, and C a knife for trimming the surface of the outer sole lying between the outer edge of the sole and the upper. These knives B and C are arranged together, substantially as described in the Letters Patent aforesaid, and therefore need no particular description herein.

D is a block arranged to move in a guide-way, *a*, and combined with it is a bent spring, *a'*, these several parts being arranged for the block to bear against the treading-face of the sole, and to yield to the varying thicknesses thereof, so that the edge-trimming knife B can trim the edge of the sole as the tool is drawn about the same.

E is a guard or guide attached by a slot and set-screw at *b* to the stock A, and arranged thereon relative to the trimming-knives B C, for it to bear against the upper at and along that part of the same which is against and about the edge of the inner sole. This guard E has a lip or flange, *c*, which enters between the upper and the outer sole, and the guard E in its length is divided or made in two parts, *f* and *g*. The one part, *f*, of the guard E, nearest the knives B C, is rigid, and the one part, *g*, of the guard E, the one farthest from the knives, is attached to a spring-arm, *h*, which, through slot *l* and set-screw *m*, is secured to the shank of the other part, *f*, the spring-arm *h* allowing the part to which it is attached to yield or give in a direction at right angles to the bearing of the guard on the upper at and along the edge of the inner sole, and thereby to accommodate itself to the curvature of the shank, whereby the liability of tearing the outer from the upper and inner sole by the lip *c* of the guard E between them is prevented. The guard E, bearing and otherwise lying on the upper at and along the edge of the inner sole, guards the knife, which trims the outer between its edge and the upper, from cutting the upper. By this bearing of the guard E on the upper at and along the edge of the inner sole the inner sole becomes the form to and by which to trim the outer sole, and from which the outer sole will take its outline and shape while being trimmed, so that an outer sole of a boot or shoe trimmed by an edge-trimming tool or machine provided with this guard will have its edge correspond to the outline and shape of the inner sole, and thus produce a uniformity to the edge of the outer sole that otherwise cannot be secured.

A guard, E, to be effective must have considerable length of bearing; but as such length of bearing, if it is rigid for the whole extent when trimming the sole at the shank, operates to separate the outer from the inner sole, the necessity and advantage of making the guard in two parts, one of which is yielding, as described, are obvious without further description.

Although the guard E has been herein described as combined with an edge-trimmer having two knives, it is obvious it is susceptible of being used in connection with trimmers of other constructions, and therefore it is not intended to limit its use to any one trimmer.

Fig. 3 illustrates in cross-section a portion of a shoe and the position of the edge-trimmer for operation, F being the outer sole, G the inner sole, and H the upper of the shoe.

Having thus described my invention, what I claim, and desire to secure by Letters Patent, is—

1. The combination, with the edge-trimming devices for boot and shoe soles, of the guard E, constructed to bear during the operation of trimming only upon that portion of the upper which lies directly against or under the edge of the inner sole, said inner sole serving as a guide and gage for the trimming of the outer sole, substantially as and for the purpose set forth.

2. In an edge-trimmer for boot and shoe soles, a guard, E, constructed in two parts, *f* *g*, one of which is arranged to yield, substantially as and for the purpose described.

3. In a sole-edge trimmer, the combination, with the trimming-knife, of the guard E, having the lip *c* attached permanently thereto, and adapted to enter between the upper and the outer sole, substantially as and for the purpose set forth.

4. In a sole-edge trimmer, the combination, with the trimming-knife, of the guard E, constructed of two parts, *f* and *g*, one of which is arranged to yield, and provided with the lip *c*, substantially as and for the purpose described.

JOSEPH D. WESTGATE.

Witnesses:

EDWIN W. BROWN,
W. S. BELLOWS.